No. 773,965. PATENTED NOV. 1, 1904.
J. J. McINTYRE & H. BAGSHAW.
HOSE BINDER.
APPLICATION FILED JUNE 24, 1904.
NO MODEL.
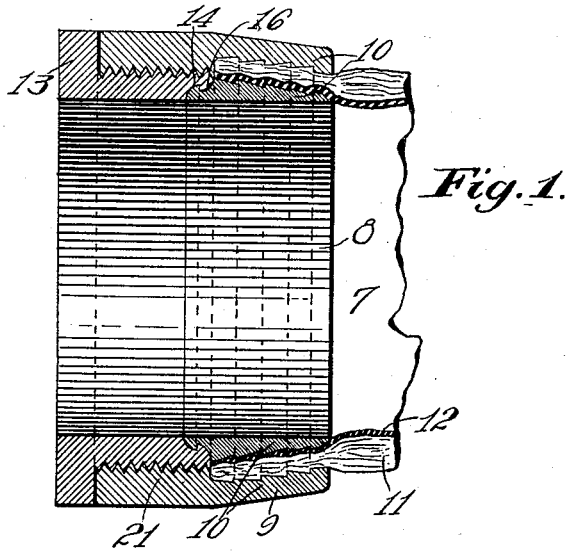
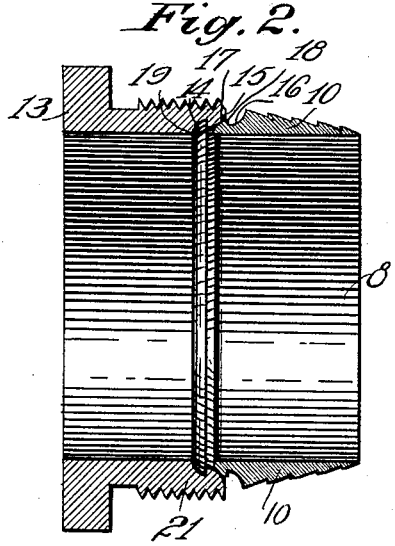
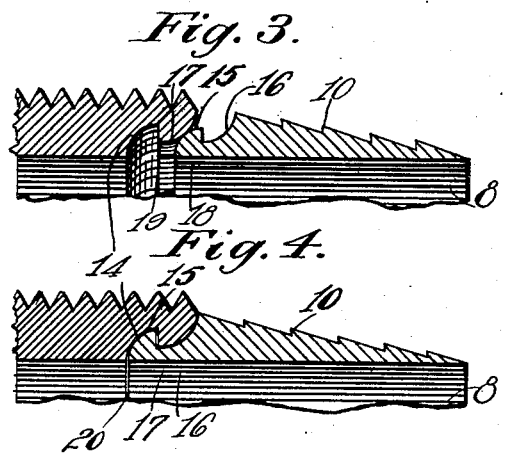
Witnesses:
Max Schwinger
Rohit Adt
Inventors:
John J. McIntyre,
Herbert Bagshaw.
By their Attorney
F. H. Richards No. 773,965.

Patented November 1, 1904.

UNITED STATES PATENT OFFICE.

JOHN J. McINTYRE AND HERBERT BAGSHAW, OF HARTFORD, CONNECTICUT.

HOSE-BINDER.

SPECIFICATION forming part of Letters Patent No. 773,965, dated November 1, 1904.

Application filed June 24, 1904. Serial No. 213,928. (No model.)

*To all whom it may concern:*

Be it known that we, JOHN J. MCINTYRE and HERBERT BAGSHAW, citizens of the United States, residing at Hartford, in the county of Hartford and State of Connecticut, have invented certain new and useful Improvements in Hose-Binders, of which the following is a specification.

This invention relates to hose-binders, and has for an object to provide an improved and efficient device of this character.

In the drawings accompanying and forming a part of this specification, Figure 1 is a central longitudinal section of the binder made in accordance with the present improvements and shows a broken-off portion of hose held in position thereby. Fig. 2 is a similar view of two of the members of the hose-binder disconnected. Fig. 3 is an enlarged detail of the parts shown in Fig. 2; and Fig. 4 is a view similar to Fig. 3, but showing the parts in their assembled position.

In the drawings the hose (designated in a general way by 7) is shown clamped between an expander member 8 and a binder member 9, each of which is provided with annular retaining-abutments 10, comprising a series of teeth or ridges whereby the hose is securely held in position. The hose herein illustrated is supposed to represent an outer fabric portion 11 and an inner rubber lining portion 12. The latter being readily puncturable, it is essential that the binding of the hose be done in such a manner that the lining will be maintained inviolate, for if the binding or other means produces a rupture of the lining the hose will break and the binding will be ineffectual. In drawing the binding member 9 over the expanded end of the hose and the expander it is desirable that the expander be self-centering to a certain extent in some instances and that the same does not rotate upon the hose or within the same.

The expander is shown carried by the coupling member or block 13 and as having a double ball-joint connection therewith. The coupling member is shown as having a ball-socket 14, in which a bearing 15 of the expander may seat, and the expander is shown as having a ball-seat 16 to receive a bearing 17 of the coupling member, whereby after the parts have been assembled there will be a double ball-joint provided between the expander and the coupling member. The faces 14 and 16 are oppositely curved, as are also the faces 15 and 17, whereby it may be that in practice the face 15 will lie against the face 14 at one side of the device and the face 16 will lie against the face 17 at the opposite side. This organization will give a comparatively large amount of self-centering and ball-joint action. The parts may be made in any suitable manner and assembled. The lip 18 may be made slightly larger in diameter than the lip 19 and the two parts assembled by being pressed together, after which any deflection of the inner member may be rectified by driving a mandrel within it—that is, assuming that the amount of yielding was greater than the amount of yieldability which the metal would overcome by its inherent elasticity. In some instances to permit the expander to have a self-centering action and give the fullest advantage of the double ball-joint an amount of play indicated by the space, as 20, may be provided between the members constituting such ball-joint, whereby a certain amount of movement may be had. The amount of space of course will be dependent upon the various sizes of hose and the uses to which the binder is to be put.

The binding member 9 in the present instance is shown as carried by a coupling-nut 21, having screw-threaded engagement with the coupler 13, whereby after the expander has been inserted in a hose at its end the binder may be drawn up over the expander and such end of the hose, and any turning or twisting of the nut, which would otherwise have a tendency to turn the expander within the hose, will be prevented by the swivel connection between the expander and the coupler from producing a turning of the expander, and in turning up the binder it may be that the binder will not turn upon the hose, in which case the hose and the expander will move in unison with the binder until the parts assume their final position. The ball-joint connection and the swivel connection prevent the rupture of the hose in the process of assembling the parts upon the hose and also give a self-centering action to the expander, which will prevent undue pressure upon certain parts of the hose.

Having thus described our invention, we claim—

1. A hose-binder comprising a coupling-block, an expander swiveled thereto and having a double ball connection therewith, and a binder adapted to screw onto the coupling-block and overlie the expander.

2. In a hose-coupling the combination with a binder, a nut integrally carrying the same, a member on which the nut may screw, and an expander carried by such member by means of a double ball connection.

3. A hose-binder comprising a binding member, an expander, a block carrying the binding member and having a double ball connection with the expander.

4. The combination with a binder, of an expander, means to force the expander into the binder and having a swivel self-centering connection therewith.

5. In a hose-binder the combination with a member to support the outside of a hose, a member to expand the hose within said supporting member, and a member having screw-threaded engagement with such outside member and having a flange engaging a flange upon the expanding member to withdraw the same from the hose, and a self-centering joint between it and such expanding member to force the same into the hose.

6. In a hose-binder the combination with a member to support the outside of a hose, a member to expand the hose within said supporting member, and a member having screw-threaded engagement with such outside member and having a flange engaging a flange upon the expanding member to withdraw the same from the hose, and a self-centering double ball-joint between it and such expanding member to force the same into the hose.

7. In a hose-binder, the combination with a member to support the outside of an end of a hose and having an interiorly-screw-threaded sleeve, an expander, means having screw-threaded connection with said sleeve and carrying the expander by a double ball-joint having faces curved in opposite directions.

Signed at Hartford, Connecticut, this 16th day of June, 1904.

JOHN J. McINTYRE.
HERBERT BAGSHAW.

Witnesses:
LOUIS G. HILLMAN,
HENRY BISSELL.